United States Patent Office 2,929,822
Patented Mar. 22, 1960

2,929,822
3-SUBSTITUTED 7-CARBALKOXYAMINO-COUMARINS

Henrich Hausermann, Basel, Switzerland, assignor to J. R. Geigy, A.G., Basel, Switzerland, a Swiss firm No Drawing. Original application October 31, 1955, Serial No. 544,045, now Patent No. 2,881,186, dated April 7, 1959. Divided and this application August 25, 1958, Serial No. 757,135

Claims priority, application Switzerland November 12, 1954

5 Claims. (Cl. 260—343.2)

The invention is concerned with new 3-substituted derivatives of 7-aminocoumarin which, because of their intensive blue fluorescence, are suitable as optical brightening agents for more or less colorless organic material, in particular for organic textile fibers of the most varying origin as well as for polymeric synthetic materials. The invention also concerns processes for the production of the new 3-substituted derivatives of 7-aminocoumarin. It is further concerned with processes for the brightening of organic material with the new coumarin derivatives as well as, as industrial product, the material brightened with the aid of these compounds.

7-aminocoumarin compounds have already been suggested more than once as optical brightening agents for the most different types of substrata such as soap, cellulose fibers, wool, synthetic polypeptide fibers. However, 7-aminocoumarin compounds which are substituted in the 3-position of the coumarin ring by a phenyl radical have not been known up to now. The present invention is concerned with the production of such new 3-substituted 7-aminocoumarin compounds and derivatives thereof.

It has been found that new valuable 3-substituted 7-acylaminocoumarins are obtained if a benzaldehyde which contains in the 2-position a hydroxyl group or a substituent which can be converted into a hydroxyl group and in the 4-position contains a substituted amino group or a substituent which can be converted into an amino group, is condensed by methods known per se with a derivative of acetic acid which contains a phenyl radical at the α-carbon atom, to form the corresponding β-phenylacrylic acid derivative. If desirable, then the group in the o-position to the acrylic group in the β-phenyl radical is liberated as a hydroxyl group and this, with the carboxyl function of the acrylic acid radical, closes the coumarin ring. If necessary, the substituent producing the amino group in the 7-position is modified to form this group which is further transformed into a carbalkoxyamino group at any stage desired during the reaction.

Benzaldehydes which can be used according to the invention are, for example, the known 2-hydroxy-4-nitrobenzaldehyde and the 2-hydroxy-4-acylaminobenzaldehydes obtainable therefrom by acylating reduction. Particularly favorable, however, are the 2-alkoxy-benzaldehydes which contain a nitro, or preferably an acylamino group, in the 4-position which can be converted into the amino group. Because of disturbing side reactions, a primary amino group in the 4-position is to be avoided at all costs.

Examples of acetic acid derivatives which can be condensed and which contain phenyl substituents at the α-carbon atom are phenyl acetic acid or the esters thereof, in particular the alkyl esters, preferably however the phenyl acetic acid nitriles (benzyl cyanides). Carboxylic acid ester, carboxylic acid amide, and the nitrile groups are examples of modified carboxyl radicals in the sense of the definition.

If desired, the aromatic rings in both starting materials can be further substituted, in particular by inert substituents such as halogen, alkyl, or alkoxy groups.

The condensation to form the β-phenylacrylic acid compound is performed by methods known per se, for example in alcohol in the presence of caustic alkalies, of alkali alcoholates or of piperidine. If o-alkoxy aldehydes are used for the condensation, then the liberation of the hydroxyl group follows; it is performed advantageously with anhydrous aluminum chloride in inert organic solvents such as benzene, chlorobenzene or nitrobenzene, or in the aluminum chloride-sodium chloride melt, in the pyridine chlorohydrate melt or also with a solution of hydrogen bromide in glacial acetic acid. Often the coumarin ring is closed at the same time. For this, it is not necessary that the carboxyl group of the acrylic acid radical should be in the free form; it can be in the modified form of the carboxylic acid ester, carboxylic acid amide and, preferably, of the nitrile group.

If the coumarin ring has not been closed on the dealkylation of the alkoxy group or if a β-(2-hydroxyphenyl)-acrylic acid derivative is obtained as reaction product in the first step, then it is advantageous to close the ring with a solution of hydrogen halide in a lower fatty acid. However, also other acid condensing agents can be used, for example zinc chloride or concentrated phosphoric acid.

If a 4-nitro-2-hydroxy- or -2-alkoxy-benzaldehyde is used as starting material, the nitro group is reduced to the amino group in some step of the reaction sketched above.

Those 3-phenyl-7-acylaminocoumarins have proved to be particularly valuable optical brightening agents, in which the acyl radical is a carbonic acid half ester, in particular, a carbalkoxy group derived from a lower alkanol with up to 4 carbon atoms which may include ether groups. The acid radical can already be present in the starting material or it can be introduced into the 3-phenyl-7-aminocoumarin only in the last step of the reaction. In the latter case, a 3-phenyl-7-aminocoumarin is advantageously reacted in organic solution, and if desired in the presence of acid binding agents and of tertiary nitrogen bases favoring the acylation, with chloroformic acid esters. An important modification of the process according to the present invention consists in converting the 3-phenyl-7-aminocoumarins by methods known per se with phosgene in inert organic solvents while warming, into the 3-phenylcoumarinyl-7-isocyanates and reacting these with alcohols to form urethanes.

Thus, the new 3-phenyl 7-carbalkoxyaminocoumarin compounds correspond to the general Formula I

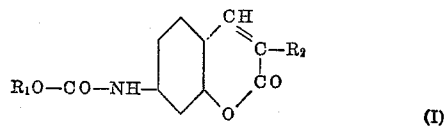

(I)

wherein $R_1$ represents a lower aliphatic radical comprising at most 4 carbon atoms which may include ether groups, and $R_2$ represents a member selected from the group consisting of phenyl, methylphenyl and chlorophenyl radicals. Also the benzene ring of the coumarin structure can be further substituted.

According to their composition, the new 3-phenyl-7-carbalkoxyaminocoumarins have a more or less strong blue fluorescence. In contrast to the 7-aminocoumarins used up to now for optical brightening, the new 3-phenyl-7-aminocoumarin derivatives have a vivid blue fluorescence in the acylated condition. They can be used for example for the optical brightening of polyamide and polyurethane fibers, and of cellulose acetate. They can also be incorporated in polymeric synthetic substances such as polyvinyl chloride, polystyrol or polyethylene and these polymers can be worked up to form fluorescent plastic foils.

This application is divided out of my copending application Serial No. 544,045, filed October 31, 1955 (now U.S. Patent No. 2,881,186).

The following examples illustrate the invention without limiting it in any way. Where not otherwise stated, parts are given as parts by weight and the temperatures are in degrees Centigrade. The relationship of parts by weight to parts by volume is as that of kilogrammes to liters.

*Example 1.—Preparation of 3-phenyl-7-aminocoumarin*

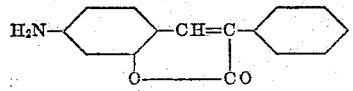

(a) 19.3 parts of 2-methoxy-4-acetylamino-benzaldehyde (J. Chem. Soc. 1741 (1927)) and 11.7 parts of benzylcyanide are dissolved in 200 parts of 95% alcohol and the temperature is reduced to 25–30°. A solution of 7.5 parts of 50% caustic potash solution in 40 parts of 95% alcohol is quickly poured in while stirring. The temperature rises slightly and after a few minutes a firm yellow precipitate is formed. The mixture is heated for 30 minutes at 40–45° to complete the reaction. After cooling to 20°, the precipitated yellow colored reaction product is filtered off, washed with alcohol and water and dried. In this way 26 parts of $\alpha$-phenyl-$\beta$-(2-methoxy-4-acetylaminophenyl)-acrylonitrile are obtained as a yellowish powder. The product can be purified by recrystallization from 10 times the amount of chlorobenzene, but this purification is not necessary for the following reaction to close the ring. The recrystallized preparation melts at 195° and has a yellow fluorescence in ultra-violet light.

(b) 63 parts of the $\alpha$-phenyl-$\beta$-(2-methoxy-4-acetylaminophenyl)-acrylonitrile obtained are distributed while stirring in 500 parts of abs. benzene and 160 parts of pulverized anhydrous aluminum chloride are added. The temperature rises from 20 to about 40°. The yellow-brown reaction mixture is then boiled under reflux for 6 hours while stirring and, after cooling, 800 parts of ice and 100 parts of 30% hydrochloric acid are added. After the benzene has been removed by steam distillation, the yellow precipitate obtained is filtered off under suction and washed with water. The substance obtained is not uniform and contains, apart from some 3-phenyl-7-aminocoumarin, the acetylation product thereof and in addition a non-cyclised product, from the analysis values and chemical properties of which it can be deduced that it is an acetylamino-hydroxy-carboxylic acid amide of the formula:

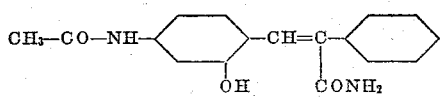

This yellow mixture of substances is then boiled under reflux in a mixture of 700 parts of 85% acetic acid and 118 parts of 36% hydrochloric acid while stirring. The yellow body is converted into grey to grey-beige tiny crystals, the chlorohydrate of 3-phenyl-7-aminocoumarin. After cooling, this chlorohydrate is filtered off and washed once with cold 80% acetic acid. To produce the free base, the chlorohydrate is suspended in 1000 parts of water whereupon complete hydrolysis into the free base and hydrochloric acid occurs. The yellow colored 3-phenyl-7-aminocoumarin so obtained which fluoresces an extraordinarily blue to blue-green color in alcoholic solution is filtered off, washed until the reaction is neutral and, after drying, it is recrystallized from alcohol or chlorobenzene. In this way, 42–45 parts, i.e. 83–89% of the theoretical amount, of pure 3-phenyl-7-aminocoumarin are obtained, M.P. 208–209°. The aminocoumarin crystallizes into yellow needles and in organic solvents has a very intensive fluorescence which can vary according to the type of solvent from blue-violet (benzine) to greenish-blue (alcohol).

(c) 6 parts of $\alpha$-phenyl-$\beta$-(2-methoxy-4-acetylaminophenyl)-acrylonitrile obtained according to paragraph (a) above, are heated for 30 minutes with 30 parts of pyridine chlorohydrate at 180–200° and then the melt obtained is poured into 150 parts of water. The yellow-brown body which precipitates is filtered off, washed with water, dissolved hot in 40 parts of pyridine, filtered and 10 parts of acetic anhydride are added. On cooling, brownish colored crystals precipitate which are drawn off under suction and purified by recrystallization from methylcellosolve. 3-phenyl-7-acetylaminocoumarin is obtained in this way as almost colorless needles which melt at 265°. The acetyl derivative is converted into the 3-phenyl-7-aminocoumarin as described in the preceding paragraph (b) by boiling with concentrated hydrochloric acid.

(d) 4 parts of $\alpha$-phenyl-$\beta$-(2-methoxy-4-acetylaminophenyl)-acrylonitrile obtained according to paragraph (a), are added to a melt of 32 parts of aluminum chloride and 8 parts of sodium chloride at 120–130° and the whole is stirred at the same temperature for 5 minutes. Ice and 30% hydrochloric acid are then added to the yellow melt, the yellow body which precipitates is filtered off, washed and finally boiled with acetic acid+hydrochloric acid in a manner analogous to that described in paragraph (b). Working up analogous to paragraph (b) produces the same 3-phenyl-7-aminocoumarin which melts at 208°.

*Example 2.—Preparation of 3-(4'-chlorophenyl)-7-aminocoumarin*

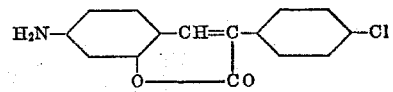

15.2 parts of p-chlorobenzyl cyanide and 19.3 parts of 4-acetylamino-2-methoxybenzaldehyde in 200 parts of 95% alcohol are condensed in a manner analogous to that described in (Example 1a) with 7.5 parts of 50% caustic potash solution. The $\alpha$-(p-chlorophenyl)-$\beta$-(2-methoxy-4-acetylaminophenyl)-acrylonitrile obtained crystallizes from chlorobenzene in fine yellow clusters of needles, which melt at 250° uncorrected. In ultra-violet light the substance fluoresces bright greenish yellow. In order to convert the acrylonitrile derivative obtained into 3-(p-chlorophenyl)-7-aminocoumarin, it is added at 110–115° to a melt of 200 parts of anhydrous aluminum chloride, 40 parts of sodium chloride and 10 parts of potassium cloride while stirring, and stirring is continued for 30 minutes at 105–110° until a homogeneous brown melt is obtained. The melt is then poured while stirring into a mixture of 1000 parts of ice and 100 parts of 30% hydrochloric acid and the whole is heated for 1 hour at 80–90° while stirring. The yellow suspension obtained is cooled to 20°, the yellow precipitate is filtered off, washed with water and then stirred for 3 hours at 100° in a mixture of 300 parts of 80% acetic acid and 50 parts of 30% hydrochloric acid. The pale yellow precipitate obtained is filtered after being cooled, washed with 80% acetic acid, stirred in 300 parts of water, again filtered and washed until the reaction is neutral. After drying, 21 parts of the crude 3-(p-chlorophenyl)-7-aminocoumarin are obtained as a greenish-yellow powder. The new compound crystallizes from chlorobenzene in small yellow crystals which melt at 252° uncorrected. 3-(p-chlorophenyl)-7-aminocoumarin fluoresces blue-green to greenish blue in alcohol and bright pure blue in benzene or acetone.

The same product is obtained if in this example the 19.3 parts of 2-methoxy-4-acetylaminobenzaldehyde are replaced by 20.7 parts of 2-ethoxy-4-acetylaminobenzaldehyde (M.P. 136°).

*Example 3.—Preparation of 3-(4'-methylphenyl)-7-aminocoumarin*

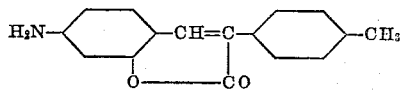

13.1 parts of p-methylbenzyl cyanide are reacted in a manner analogous to that described in Example 2 with 19.3 parts of 2-methoxy-4-acetylaminobenzaldehyde to form α-(-methylphenyl)-β-(2-methoxy-4-acetylaminophenyl)-acrylonitrile (yellow platelets from chlorobenzene, M.P. 222°) and then further condensed to form the coumarin compound.

3-(p-methylphenyl)-7-aminocoumarin obtained (M.P. 220°) has similar properties to the product produced according to Example 1.

*Example 4.—Preparation of 3-phenyl-coumarinyl-(7)-isocyanates*

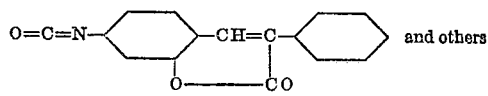

23.7 parts of 3-phenyl-7-aminocoumarin are dissolved in 1000 parts of abs. chlorobenzene at 110° and converted into the chlorohydrate by the introduction of abs. hydrogen chloride. The almost colorless suspension of the base hydrochloride so obtained is then cooled to 50° and is reacted at a rising temperature while stirring with excess phosgene. As soon as the temperature has reached 100–110°, phosgene is still introduced until the HCl formation is complete. The temperature is then raised to 130°, upon which an almost complete solution is obtained. After hot filtration from the chlorobenzene solution, the resulting 3-phenylcoumarinyl-(7)-isocyanate crystallizes out in colorless glittering little flakes. After cooling completely, the crystals are drawn off under suction, washed with some benzene and dried for a short time. The yield is 22–24 parts, i.e. 83–92% of the theoretical. The new isocyanate melts at 233° uncorrected, and in inert organic solvents it has a fairly strong blue to violet fluorescence in daylight.

Because of its —N=C=O group which can be easily hydrolyzed, the isocyanate itself is not so suitable as a brightening agent but it is a very valuable intermediate product for the production of numerous ureas and urethanes which are suitable as brightening agents.

If in this example the 23.7 parts of 3-phenyl-7-aminocoumarin are replaced by 25.1 parts of 3-(p-methylphenyl)-7-aminocoumarin or by 27.15 parts of 3-(p-chlorophenyl)-7-aminocoumarin, then the 3-(p-methylphenyl)-coumarinyl-(7)-isocyanate (M.P. 214°) or the 3-(p-chlorophenyl)-coumarinyl-(7)-isocyanate (M.P. 225°) respectively are obtained. These isocyanates are valuable intermediate products for the production of optical brightening agents.

*Example 5.—Preparation of 3-phenyl-7-carbalkoxyaminocoumarins*

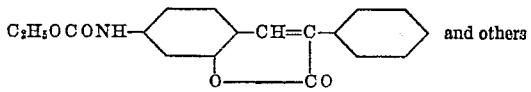

4.74 parts of 3-phenyl-7-aminocoumarin are suspended in 250 parts by volume of acetone, 10 parts of pulverized anhydrous potassium acetate are added and the whole is added over 1 hour at 55–65° while stirring to 10 parts of chloroformic acid ethyl ester. After stirring for 1 hour at 55–65° the reaction mixture is cooled to 0–10°, the yellowish white precipitate is filtered off and washed free of salt with water. The 3-phenyl-7-carbethoxyaminocoumarin obtained crystallizes from alcohol in pale yellow crystals which melt at 216–217°. In alcohol the urethane fluoresces blue-violet and is suitable for the optical bleaching of acetate silk and nylon. The same product is obtained if 3-phenyl-coumarinyl-(7)-isocyanate is boiled for some hours under reflux in excess abs. ethanol. Analogous compounds (containing the 3-(p-methylphenyl)- and 3-(p-chlorophenyl)- groups), useful as brightening agents, are obtained if the isocyanates described in the last paragraph of the preceding Example 4 are boiled with excess absolute lower alkanols. The following urethanes which have similar properties can be produced in an analogous manner:

CH₃OCONH—Ph—Cou............................. M.P. 237° uncorrected
CH₃CH₂CH₂OCONH—Ph—Cou................. M.P. 209°

$$\begin{array}{c}CH_3\\ \phantom{x}\searrow\\ \phantom{xx}CHOCONH-Ph-Cou\\ \phantom{x}\nearrow\\ CH_3\end{array}$$ M.P. 229°

CH₃(CH₂)₃CH₂OCONH—Ph—Cou.............. M.P. 190°
CH₃OCH₂CH₂OCONH—Ph—Cou................ M.P. 191°

(—Ph—Cou means the 3-phenyl-coumarinyl-(7) radical).

*Example 6.—Optical brightening of synthetic polypeptide fibers*

10 parts of slightly yellowish nylon material are dyed for 30 minutes at 60–70° in a dyebath (liquor ratio 1:40) which contains 0.005 part of the brightening agent obtained according to Example 5. The goods are rinsed with cold water and dried in the air. The material so treated has a much whiter appearance than untreated material.

A very similar action is obtained if instead of the brightening agent according to Example 5, one according to the table of Example 5 is used.

*Example 7.—Optical brightening of cellulose acetate*

10 parts of acetate silk yarn of a slightly yellowish appearance are dyed in a 75° hot bath for 30 minutes (liquor ratio 1:30) which contains 0.0025 part of the 3-phenyl-7-aminocoumarin obtained according to Example 5. After rinsing and drying, the treated acetate silk has a much whiter appearance than untreated acetate silk.

What I claim is:

1. A 7-carbalkoxyaminocoumarin derivative having the general formula:

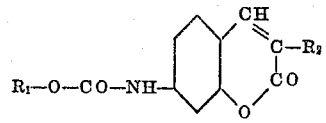

wherein R₁ represents a member selected from the group consisting of lower alkyl and (lower)alkoxy(lower)alkyl and R₂ represents a member selected from the group consisting of phenyl, methylphenyl and chlorophenyl radicals.

2. The 7-carbalkoxyamino-3-phenyl-coumarin of the formula:

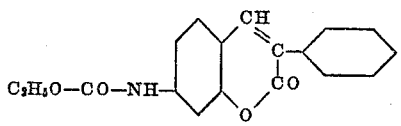

3. The 7-carbalkoxyamino-3-phenyl-coumarin of the formula:

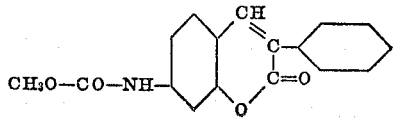

4. The 7-carbalkoxyamino-3-phenyl-coumarin of the formula
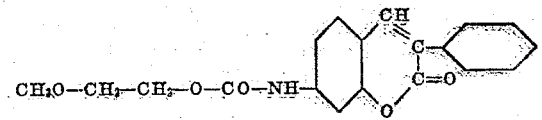
5. The 7-carbalkoxyamino-3-phenyl-coumarin of the formula
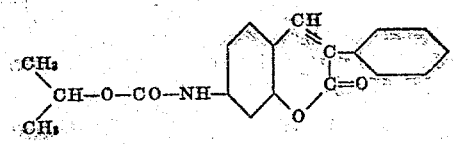
No references cited.